Feb. 11, 1969  D. O. LOSEE  3,427,626
RIGID SECTIONAL RADOME AND METHOD FOR ERECTING
Filed Nov. 12, 1965
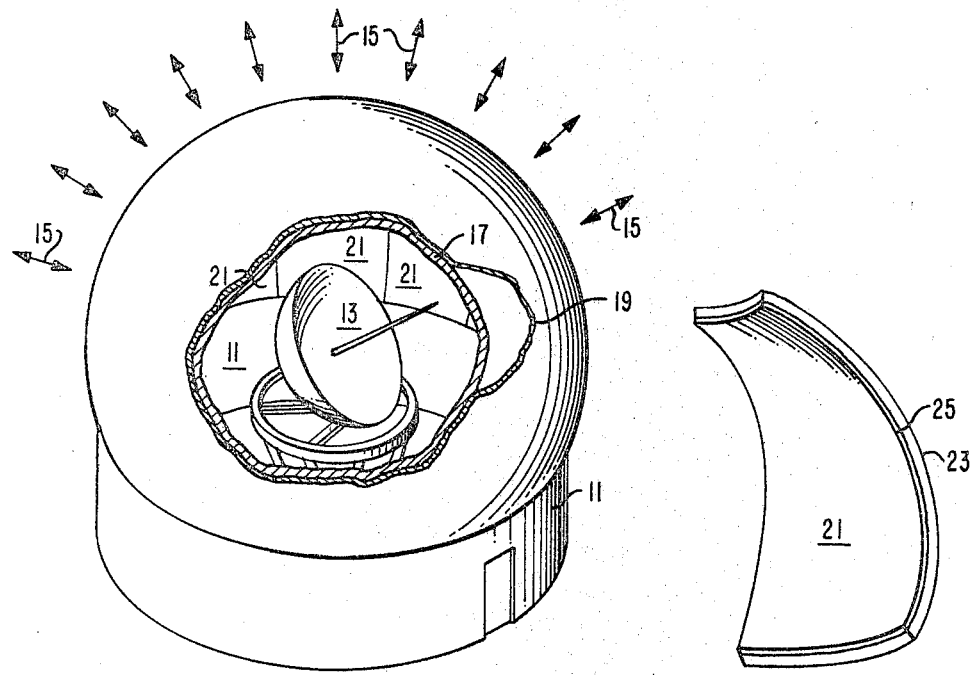
FIG.-1
FIG.-2
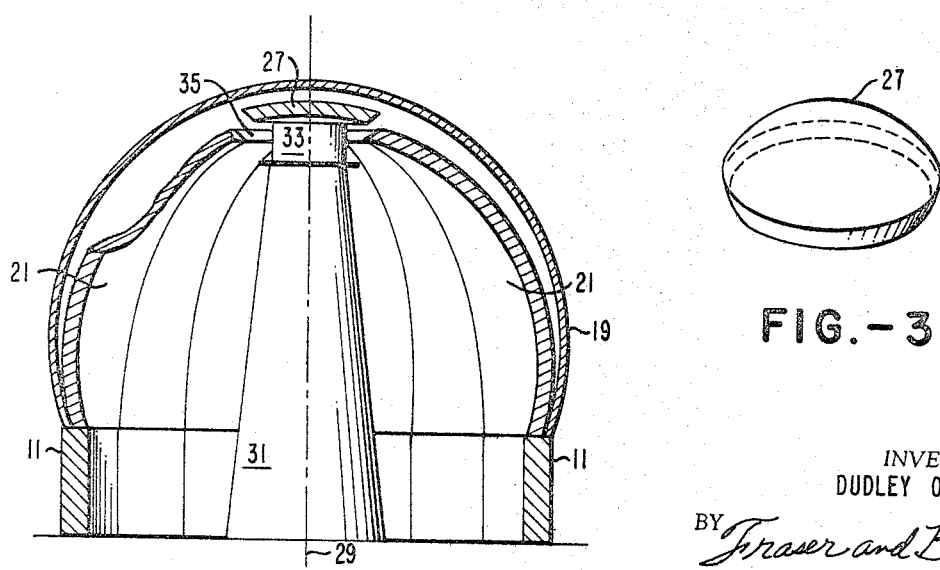
FIG.-4
FIG.-3
INVENTOR.
DUDLEY O. LOSEE
BY *Fraser and Bogucki*
ATTORNEYS

INVENTOR.
DUDLEY O. LOSEE

BY Fraser and Bogucki

ATTORNEYS

United States Patent Office 3,427,626
Patented Feb. 11, 1969

3,427,626
RIGID SECTIONAL RADOME AND METHOD
FOR ERECTING
Dudley O. Losee, San Diego, Calif., assignor to Whittaker
Corporation, a corporation of California
Filed Nov. 12, 1965, Ser. No. 507,350
U.S. Cl. 343—872        15 Claims
Int. Cl. H01q 1/42

ABSTRACT OF THE DISCLOSURE

A spherically shaped outer elastic cover layer is inflated to permit assembly of an inner shell structure composed of abutting spherical segments to form a spherical inner shell structure larger than the uninflated outer cover. The outer cover is then deflated to place the outer surface of the inner shell structure under contracting tension to hold the abutting segments of the inner shell structure in place against one another.

---

This invention relates to rigid, self-supporting structures and methods of erecting the same, and more particularly to an easily erectable and durable radome which provides homogeneous electrical properties as well as protection from the environment.

The term "radome" is applied to electrically transparent housings for electromagnetic wave energy systems, and as used herein, is intended to apply to these and comparable systems. including systems employing the infrared portion of the spectrum. Radomes must be as electrically homogeneous as possible in order to provide good reception and transmission of wave energy. The terms "electrically homogeneous" or "electrical homogeneity" are used herein to refer to a radome having a dielectric constant which is close to that of air and which is uniform over all portions of the radome. High dielectric constant values and dielectric constant variations in a radome lead to boresight error and attenuation of the wave energy being transmitted or received. Radomes also must, depending upon environment, have adequate rigidity and durability to withstand the climatic conditions they are to encounter. When they are located in the polar regions, they may have to withstand extremely high winds, snow and ice storms, and extreme temperatures, while maintaining the desired electrical characteristics.

Large radomes are often constructed using a plurality of triangular panels which are joined together in a lattice or geodesic arrangement by frame and hub elements. This structure is electrically discontinuous, inasmuch as the panels are typically made of glass fiber reinforced plastic and the frame and hub elements of metal. The different materials and thicknesses refract and reflect the transmitted and received waves introducing both boresight error and attenuation.

Because of the electrical aberrations present in radomes of the geodesic type, attempts have been made to build radomes which have the necessary homogeneous electrical properties and adequate structural rigidity. Thus, some domes have been built using an inflatable elastic envelope of film or sheet plastic often including woven fabric reinforcement having uniform thickness. These inflatable radomes must be kept under pressure at all times, and if punctured under extreme environmental conditions, the radome will weaken or collapse. Furthermore, such inflatable radomes are constantly changing shape due to wind pressures and phase-front distortion results from the passage of waves through the dome at constantly changing and unpredictable angles of incidence.

It is therefore an object of the invention to provide a rigid, self-supporting radome of homogeneous construction.

It is an object of this invention to provide a rigid, self-supporting and durable radome which possesses uniform and homogeneous wave transmission properties.

It is a further object of this invention to provide a rigid, durable, and self-supporting radome which has homogeneous electrical properties and is relatively easy to assemble.

It is a further object of this invention to provide an improved method of erecting protective structures for antennas.

In brief, particular arrangements in accordance with the invention may comprise a structure having a rigid inner shell formed by a plurality of panel or relatively thick wall segments and a layer of elastic material disposed under tension about the outside surface of the shell. The tension of the elastic material results in an equal but opposite compression in the wall segments of the shell which compression tends to hold such segments together at their joints. As a result, a unique cooperation between the compressed shell of segments and the elastic skin is created providing an electrically homogeneous and symmetrical wall.

In methods in accordance with the invention, radomes are easily assembled by inflating the elastic skin, erecting the shell within the inflated skin, and deflating the skin to permit it to draw down upon the shell.

In accordance with a further aspect of the invention the elastic material may be preshaped in an approximately spherical configuration to form an elastic envelope. Such envelope is secured to a base member and inflated outwardly until it swells to a size somewhat larger than its uninflated size. The rigid shell may then be assembled within the inflated envelope around the base member, and is typically fashioned in the same shape as the envelope and is larger than the uninflated envelope but smaller than the inflated envelope. The inflated envelope is then depressurized or vented to the atmosphere allowing it to collapse onto the outer surface of the shell resulting in a tension-compression effect because of size differential.

In accordance with further aspects of the invention, the wall segments may be made from a plurality of layers of material of uniform thickness bonded together; and they can be joined together by the use of an adhesive, or by fashioning their edges so that they interlock such as in a tongue and groove arrangement, for example, to provide greater rigidity. Furthermore, the segments can be shaped for uniform internal force distribution and relative ease of erection. For example, a plurality of wall segments of substantially like size and shape may be disposed around a base member, with their upper edges defining a circular aperture, in which is disposed a central segment completing the shell. Alternatively, a pair of concentrically positioned envelopes may be inflated to different diameters and the space between them filled with a foam or liquid synthetic material. When the synthetic material solidifies, it forms a unitary shell against the tensioned inner and outer envelopes.

The novel features of this invention, as well as the invention itself, both as to its organization and method of operation, may better be understood in the light of the following description, when taken in connection with the accompanying drawings in which:

FIGURE 1 is a perspective, partially cut away, view of a radome in accordance with the present invention;

FIGURE 2 is a perspective view of a curved wall segment of the arrangement of FIG. 1;

FIGURE 3 is a perspective view of a central wall segment of the arrangement of FIG. 1;

FIGURE 4 is a side sectional view of the radome of FIG. 1 showing an intermediate stage in the assembly of the shell within the inflated envelope;

FIGURE 5 is a side sectional view of the radome of

Figure 6:
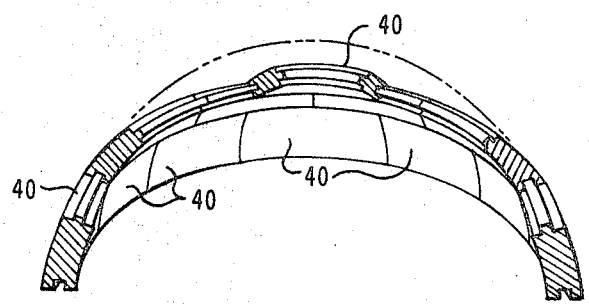
Figure 7:
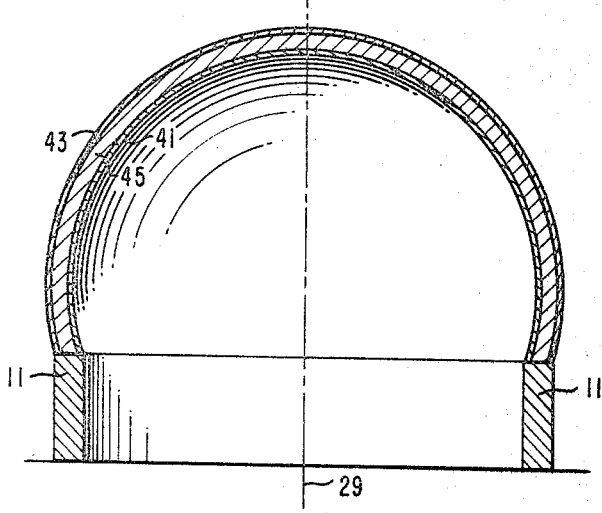

FIG. 4 showing the envelope collapsed on the assembled shell;

FIGURE 6 is a fragmentary perspective view of a portion of a different shell construction in accordance with the invention; and FIGURE 7 is a side sectional view of a different radome in accordance with the invention;

FIGURE 1 illustrates one form of a radome is accordance with this invention. The radome system includes a cylindrical base member 11 located in relation to the axes of the internal antenna system 13 which receives and transmits electromagnetic wave energy, as represented by the arrows 15. The radome itself comprises an inner shell 17, the outside of which is encompassed under tension by an elastic envelope 19. The inner shell 17 may be sectioned in a variety of ways, but here consists of a number of curved wall segments 21 (FIG. 2) symmetrically disposed about the structure and a central wall segment 27 (FIG. 3). Insasmuch as any conventional means for attaching the inner shell 17 and the elastic envelope 19 to the base 11 may be used, these have not been shown in detail.

FIGURE 2 illustrates the curved wall segments 21 of FIG. 1 in further detail. They are here alike in size and shape and typically include a material such as polyurethane or epoxy foam which will provide structural strength under compression. The curved wall segments can be fashioned from a single layer of material or can be composed of a plurality of layers of material laminated together, as determined by structural requirements. The individual wall segment 21 has a core 23 portion and a skin 25 portion. The core 23 is a relatively thick and lightweight member having a high compression strength. It is here of foam, but also may be of impregnated plastic, paper or like low density core material. The skin 25 portion is a relatively thin member having radio-frequency physical properties which approximate those of the envelope 19 and here comprises glass fiber reinforced plastic. It is preferred that the layers of the curved wall segments have uniform thickness, and that the materials have a dielectric constant close to that of air (unity). Thus, the resultant structure is essentially electrically homogeneous.

A central wall segment 27 is shown in FIG. 3, and functions as a keystone for the shell 17. The central wall segment 27 has the same laminate structure and thickness as the curved wall segments 21 but a spherical outline which mates with the curved wall segments 21 to form the spherical shell 17.

FIGURE 4 illustrates an intermediate step in the erection of a radome in accordance with the invention. The base member 11 is symmetricallly disposed about a vertical axis 29. The envelope 19 is fastened about the upper end of the base member 11 and inflated, as shown. The envelope is maintained in this inflated position by internal pressure long enough to erect the shell structure within. For the central wall segment 27, a support stand 31 for a jack 33 is positioned at the vertical axis 29. The central wall segment 27 is raised by the jack 33 well above the position it is to assume when the shell is assembled. The curved wall segments 21 are concurrently or subsequently joined together and to the upper end of the base member 11 so as to form the generally spherical principal part of the shell. When so positioned, they define an aperture 35 about the vertical axis 29 at the top of the sphere. The jack 33 is then lowered allowing the central wall segment 27 to position itself within the aperture 35 thereby joining one zone of the sphere to a complementary zone of the sphere formed by the curved wall segments and completing the formation of the shell. The inflated envelope 19 is then depressurized, as by venting the atmosphere, allowing it to collapse into a tensioned contact with the outside of the shell 17. The radome then is a rigid, self-supporting structure and the jack 33 and support stand 31 are removed.

Figure 5:
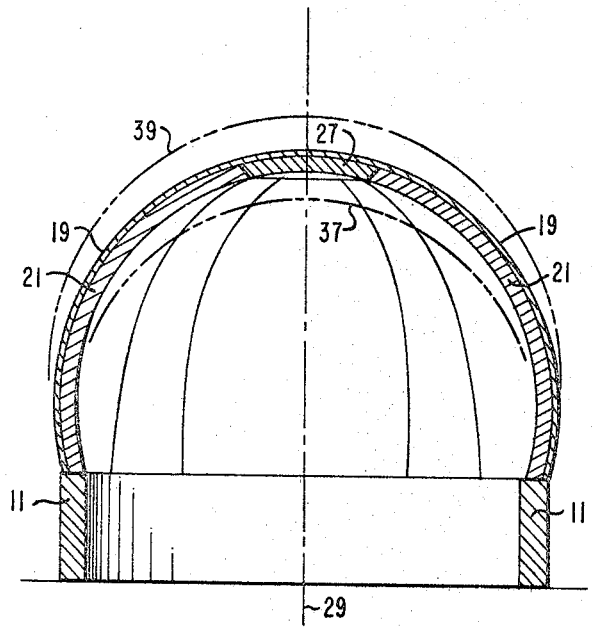

The completed wave transmission portions of the radome are depicted in FIGURE 5. The elastic envelope 19 is preshaped to the shape of, but smaller in size than the shell, when in its static, uninflated position as shown by the dashed line 37. When it is inflated to permit erection of the shell, the envelope 19 assumes the approximate position shown by the dashed line 39. It will therefore be appreciated that the envelope 19 when in contact with the shell 17 is larger than its uninflated position and is thereby held under tension. Since the tensioned envelope 19 is in intimate contact with the outside of the shell 17, compressive forces equal in magnitude and opposite in direction from the tension forces in the evelope 19 are created in the shell 17. These compressive forces urge the abutting faces of the various wall segments 21 together, thereby uniting the structure without the necessity for adhesive or joining means in most installations.

The elastic envelope 19 primarily withstands the tension loads induced into the structure by the environment while the wall segments 21 primarily withstand the shear and compression loads. If extreme shear stresses are to be withstood, it may be necessary to strengthen the segment joints. A thin film of adhesive can be employed at the joints, or the segment edges can be fashioned in a tongue and groove arrangement or similar type arrangement and disposed in mating relation. A thin film of adhesive material is virtually electrically transparent. Other joinder arrangements such as the tongue and groove connection are substantially nonrefractive if the facing surfaces mate tightly. The entire radome thus appears to be electrically jointless and boresight error and attenuation, as well as phase-front distortion, are virtually eliminated.

The elastic envelope 19 may be made of a suitable elastic material such as "Mylar" which retains its elasticity and has relatively little creep. The envelope material preferably also has equal stretch in all directions so that uniform tension is applied to the shell and a long "memory" so that the tension remains indefinitely.

Further in accordance with the invention, the shell 17 may be constructed of substantially like curved segments 40 as shown in FIGURE 6. The segments 40 comprise generally square, single blocks having tongue and groove interlocks. The block segments 40 are preferably foam units, and of relatively greater thickness than in the previous example, to provide adequate rigidity and strength. Although a single standardized spherical segment block cannot be used throughout, it is of course feasible to employ triangles, hexagons and other shapes to build the sphere, and these can be based upon a single basic module.

A different arrangement in accordance with the invention is depicted in FIGURE 7. This particular arrangement employs an inner elastic envelope 41 and an outer elastic envelope 43 which are affixed about the inner and outer portions respectively of the upper end of the base member. The outer elastic envelope 43 is pre-formed so that its diameter is slightly larger than the diameter of the inner elastic envelope 41. Thus, when both envelopes 41, 43 are differentially pressurized they inflate to the proper size so that they are concentrically equidistant from each other throughout, as shown in FIGURE 7. Both envelopes 41, 43 are maintained in the inflated position while a suitable synthetic foam material 45 such as polyurethane or polystyrene having a dielectric constant approximating unit is injected into the space between them. Upon solidification of the foam shell 45 the radome is complete. The elastic envelopes 41, 43 remain in tensioned contact with the foam shell 45 giving the radome a standard double wall design configuration and providing extra strength and rigidity.

Although there have been described specific methods and arrangements of a radome in accordance with the invention for the purpose of illustrating a manner in which the invetnion may be used to advantage, it will be appreciated that the invention is not limited thereto. Accordingly, any and all modifications, variations or equivalent arrangements falling within the scope of the annexed claims should be considered to be part of the invention.

What is claimed is:

1. A self-supporting structure for the transmission of wave energy comprising an inner shell structure having rigid abutting spherical segments defining an outside surface of generally spherical curvature and a layer of expanded material in contact under contracting tension with the outside surface of the inner shell structure.

2. A rigid, self-supporting radome comprising a plurality of rigid wall segments having edges abutting each other to form a closed shell, and a layer of expanded elastic material having a relatively low dielectric constant encompassing the outside of said shell under contracting tension, said shell having a substantial thickness relative to said elastic material and a relatively low dielectric constant.

3. A radome for an internal antenna having homogeneous characteristics and comprising a plurality of rigid curved wall segments of like size abutting each other to form a first zone of a sphere, a central uppermost wall segment abutting the other wall segments to form a second zone of the sphere, and an expanded elastic envelope in contracting tensioned contact with the outside of the surface formed by all of said wall segments.

4. A self-supporting radome substantially free from reflection and refraction and comprising a rigid inner shell having a plurality of layers of material, each layer having uniform thickness throughout the entirety of the shell, and an outer layer of expanded elastic material having uniform thickness and encompassing under contracting tension the outside surface of said shell.

5. A housing for the uniform transmission of wave energy to and from an internal antenna system while protecting the internal antenna system from the external environment comprising a cylindrical base member supporting the internal system, a plurality of rigid inter-connected wall segments adjoining an end of the cylindrical base member and forming a rigid shell which encloses that end of the cylindrical base member, said rigid shell having material of uniform thickness and low dielectric constant throughout, and an expanded elastic sheet of uniform thickness and low dielectric constant encompassing under contracting tension the outside surface of said shell and affixed to the same end of the base as said shell, and said elastic sheet being preshaped to the shape of, but smaller in size than said shell when not under tension.

6. A housing for the uniform transmission of wave energy to and from an internal antenna system while protecting the internal antenna system for the external environment comprising a cylindrical base member for supporting the internal antenna system, a plurality of rigid edge abutting wall segments mounted on the cylindrical base member and forming a rigid, generally spherical principal part of a shell enclosing the upper portion of the base member, said rigid shell comprising material of substantially uniform dielectric constant and thickness throughout, an expanded elastic member of uniform thickness in contact under contracting tension with the outside surface of said shell and affixed to the same end of the base as said shell, and said elastic member being preshaped to the shape of, but smaller in size than, the outer diameter of said shell when not under tension.

7. The housing of claim 6 wherein the abutting edges of wall segments include tongues and grooves disposed in mating relation.

8. The housing of claim 6 including adhesive means disposed in a thin film between the abutting edges of said wall segments.

9. The housing of claim 6 wherein the majority of said wall segments are of like size and shape and said wall segments include a central uppermost wall segment at the top of the spherical shell which adjoins all of said wall segments.

10. A radome for the uniform transmission of wave energy to and from an internal antenna system while protecting the internal antenna system from the external environment comprising a cylindrical base member symmetrically disposed about a vertical axis and supporting the internal antenna system, a plurality of curved polyurethane foam wall segments of like size and shape, the segments including an additional outer layer of glass fiber reinforced plastic and having uniform thickness and disposed in abutting relation and mounted on the base member, the wall segments forming the principal part of a shell which is symmetrically disposed about the vertical axis of the base member and defining an upper aperture about that axis, a central uppermost wall segment of the same material and thickness as the other wall segments and engaged in the aperture of the principal part of the shell, and an expanded elastic envelope of uniform thickness encompassing under contracting tension the outside surface of the shell and affixed to the base member, said envelope being preshaped to the shape of, but smaller in size than the outer diameter of said shell when not under tension.

11. The method of erecting a radome comprising a relatively thick-walled shell having an outer skin comprising the steps of inflating the outer skin, erecting a relatively thick-walled shell within the inflated skin, and deflating the outer skin allowing it to position itself under tension upon the shell.

12. The method of erecting a radome comprising a thick-walled shell having an outer elastic envelope comprising the steps of inflating the elastic envelope, assembling a plurality of wall segments within the inflated envelope to form a thick-walled shell, and deflating the elastic envelope upon the shell.

13. The method of erecting a radome comprising a shell of wall segments having an outer elastic envelope comprising the steps of inflating the elastic envelope which is affixed to a base member having a vertical axis, supporting a central wall segment at the vertical axis of the base member and within the inflated envelope, assembling a plurality of wall segments about the base member to form the principal part of the shell, positioning the central segment in contact with the other segments to complete the shell, and deflating the elastic envelope.

14. The method of erecting a radome on a base member supporting an internal antenna, the radome comprising a shell of wall segments having an outer elastic layer and the method comprising the steps of pre-forming a piece of elastic material into a spherical configuration with an open end, affixing the open end of the elastic material to the base member, inflating the elastic material, positioning a plurality of wall segments within the inflated elastic material so that their edges join each other and the base member to form a closed shell about the base member, and deflating the elastic material upon the closed shell.

15. The method of erecting a radome comprising a rigid shell having inner and outer elastic layers comprising the steps of pre-forming elastic sheet material into two spherical configurations with open ends and different diameters, inflating both pre-formed sheets to different diameters and in substantially concentric relation, filling the space between the inflated configurations with a liquefied substance, and allowing the liquefied substance to solidify.

References Cited

UNITED STATES PATENTS

| | | | |
|---|---|---|---|
| 2,731,055 | 1/1956 | Smith | 343—872 |
| 2,812,769 | 11/1957 | Schaefer et al. | 343—915 |
| 2,929,581 | 3/1960 | Johnson | 343—872 |
| 2,977,596 | 3/1961 | Justice | 343—872 |
| 3,220,004 | 11/1965 | Gillespie | 343—915 |

ELI LIEBERMAN, *Primary Examiner.*